May 1, 1951 H. I. MORRIS 2,550,711
ELECTRICAL WELDING APPARATUS
Original Filed Nov. 24, 1945 3 Sheets-Sheet 1
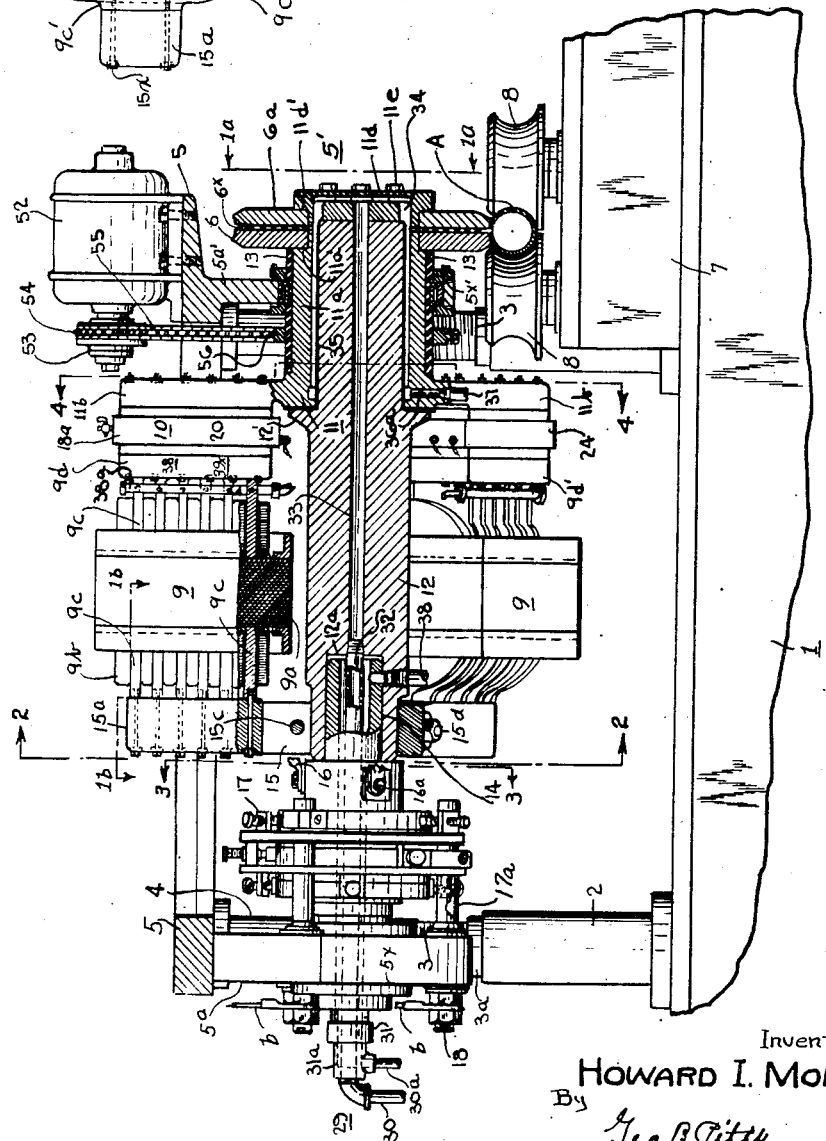
Inventor
HOWARD I. MORRIS
By Geo. B. Pitts
Attorney

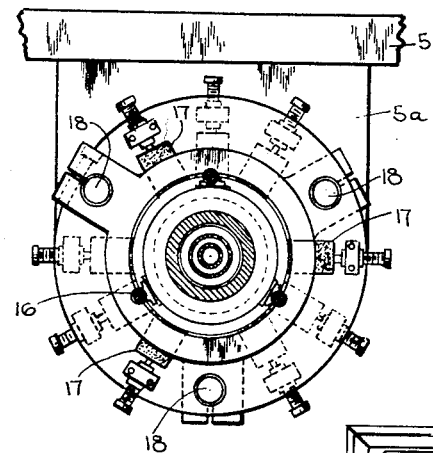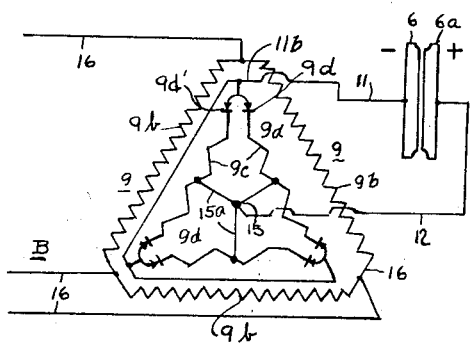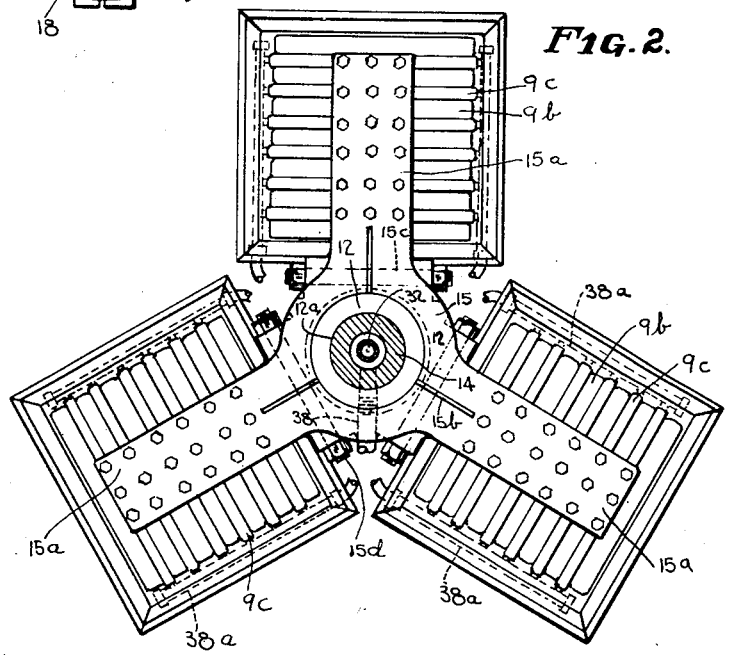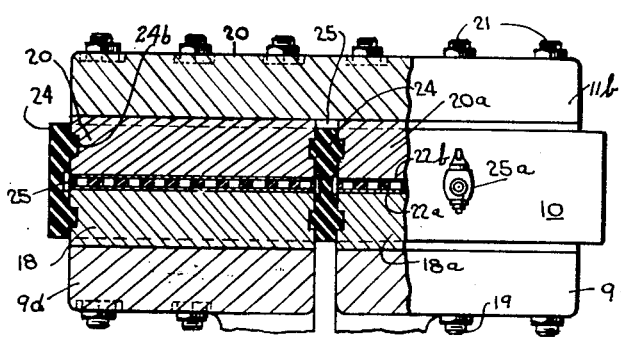

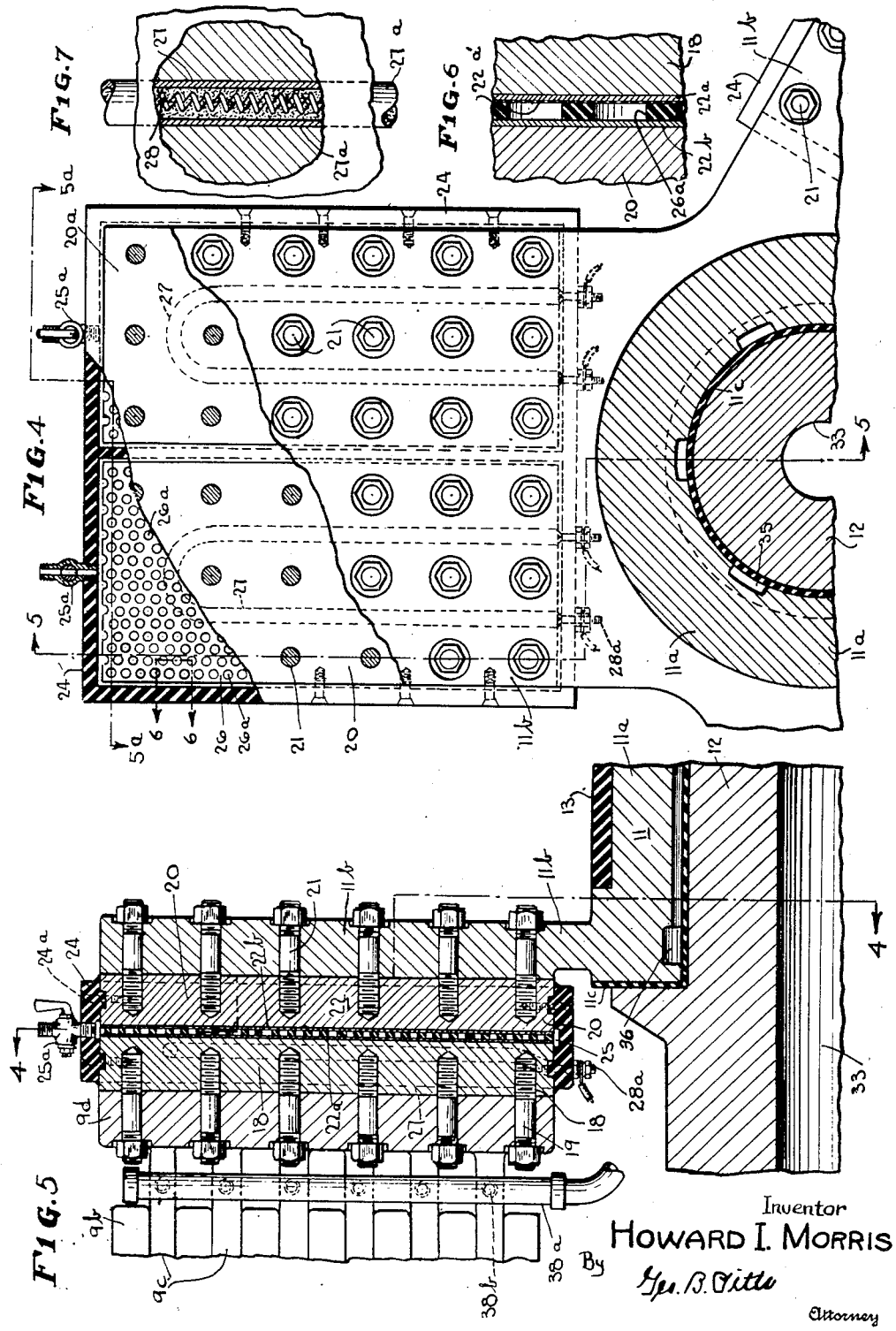

Patented May 1, 1951

2,550,711

UNITED STATES PATENT OFFICE 2,550,711

ELECTRICAL WELDING APPARATUS

Howard I. Morris, San Marcos, Calif., assignor, by direct and mesne assignments, of one-third to Harvey O. Yoder, Lakewood, Ohio, and one-third to Douglas O. Yoder, Bay Village, Ohio, and Mildred Yoder Kanzenbach, Lakewood, Ohio Original application November 24, 1945, Serial No. 630,579. Divided and this application February 13, 1950, Serial No. 143,957

5 Claims. (Cl. 219—6)

This invention relates to electrical welding apparatus, more particularly to apparatus of the resistance type, consisting of a rotatable unitary assembly to which alternating current is supplied, the current is transformed to a low voltage suitable for welding and then rectified into direct current, the assembly including a pair of electrodes to which the direct current is supplied, for effecting the welding operation.

One object of the invention is to provide an improved welding apparatus wherein all phases of a multiphase alternating current supply are utilized, thereby maintaining all phases of the supply source in balanced relation.

Another object of the invention is to provide an improved welding apparatus wherein all sliding or moving contacts between the secondary windings and the electrodes, which would tend to impose excessive resistance in the circuit and cause a reduction in the flow of the current, are eliminated.

Another object of the invention is to provide an improved welding apparatus wherein the welding operation is uniform and stitching effects, which would be present if alternating current were used, are eliminated.

Another object of the invention is to provide an improved welding apparatus wherein the apparatus requires less material and a lesser number parts, whereby costs of construction and labor in making assemblies are reduced and high efficiency and uniform welding are attained.

Another object of the invention is to provide an improved welding apparatus having incorporated therein an electronic rectifier for the supplied A. C.

Another object of the invention is to provide an improved welding apparatus comprising a rotatable assembly including a plurality of transformers the primary coils of which are connected to an A. C. supply and the secondary coils of the transformers are connected intermediate their terminals to one electrode, and an electronic rectifier between the terminals of the secondary coils of each transformer and the other electrode.

Another object of the invention is to simplify the construction disclosed in my co-pending application Serial No. 408,883, now Letters Patent No. 2,395,059, dated February 19, 1946, whereby a substantial saving in cost of construction, assembly of the parts and upkeep results.

Other objects of the invention will be apparent to those skilled in the art to which my invention relates from the following description taken in connection with the accompanying drawings, wherein Fig. 1 is a view of a welding apparatus embodying my invention, parts being broken away and other parts being shown in section;

Fig. 1a is an elevational view on the line 1a—1a of Fig. 1;

Fig. 1b is a fragmentary section on the line 1b—1b of Fig. 1;

Figs. 2 and 3 are sections on the lines 2—2 and 3—3, respectively, of Fig. 1;

Fig. 4 is a fragmentary section on the line 4—4 of Figs. 1 and 5 (enlarged), parts being broken away;

Fig. 5 is a section on the line 5—5 of Fig. 4;

Fig. 5a is a view on the line 5a—5a of Fig. 4;

Fig. 6 is a section on the line 6—6 of Fig. 4, enlarged;

Fig. 7 is a fragmentary view of a portion of Fig. 4 (parts being broken away and in section), enlarged; and Fig. 8 is a diagram of the circuit.

In the drawings, 1 indicates as an entirety a base member supporting in spaced relation a plurality of hollow uprights 2 (preferably four in number but only two being shown), each forming a bearing for a spindle or shaft 3. Each spindle 3 is provided with a collar 3a which engages a suitable thrust bearing (not shown) mounted in the upper end of the adjacent upright 2. That portion of each spindle 3 above its collar 3a is provided with screw threads, as shown, and fits into and engages the internally threaded walls of a tubular member 4 secured to and depending from a frame 5, to which reference will later be made. As will be understood, there is one tubular member 4 for each spindle 3. The spindles 3 may be simultaneously operated in any desired manner, preferably by a power driven mechanism, as disclosed in Letters Patent granted to me No. 2,283,941, dated May 26, 1942. The operation of the spindles 3 serves to raise or lower the frame 5, which, when lowered (a) insures effective frictional engagement between electrodes 6, 6a (suitably insulated from each other as shown at 6x), and the pipe A, whereby the movement of the pipe A rotates the electrodes and parts connected thereto, or (b) when raised clears the electrodes from the pipe A, as when it is desired to refinish the peripheries of the electrodes.

The base member 1 supports a box 7, in which are mounted spaced shafts (not shown), the latter extending upwardly and provided on their upper ends above the box 7 with pressure rolls 8 which engage the sides of the pipe A; suitable driven rolls (not shown) serve to feed the pipe A endwise relative to the electrodes 6, 6a.

The rolls 8 are removably mounted on their shafts, so that rolls having varying curvilinear shapes in cross section may be mounted thereon. The pipe A may be supplied in lengths or sections or supplied continuously from a suitable forming or shaping mechanism (not shown).

5' indicates as an entirety a welding apparatus, rotatably supported in suitable anti-friction bearings 5x, 5x', as later set forth, carried by hangers 5a, 5a', depending from opposite ends of the frame 5. The welding apparatus 5', as shown, consists of three single phase transformers, each indicated as an entirety at 9 (see Figs. 2 and 8), the electrodes 6, 6a, rectifiers, each indicated as an entirety at 10 and electrically connected to one of the transformers as later set forth, and conductors 11, 12, one (11) between the rectifiers 10 and one of the electrodes and the other conductor (12) between the other electrode and the secondary coils of the transformers 9.

It will be understood that my invention comprehends the employment of a multi-phase transformer and a rectifier in coupled relation thereto for each phase of a multi-phase A. C. supply; but in the preferred arrangement I provide three separate transformers 9 and a rectifier 10 in coupled relation to each thereof, one transformer for each phase of a three phase A. C. supply. Each transformer 9 is of a suitable well known construction and suitably connected, as later set forth, to the leads of each phase of the A. C. supply source B, as shown in Fig. 8; each transformer consisting of a laminated core 9a, primary coils 9b, and secondary coils 9c provided with terminals 9d, 9d' (see Fig. 8). The conductor 11 is formed of suitable conducting material, such as copper, and consists of an annular member or sleeve 11a and equally spaced arms 11b extending radially from the inner end thereof, the arms 11b being electrically connected to the rectifiers 10, as later set forth. The conductor sleeve 11a surrounds the adjacent end portion of the conductor shaft 12, but is suitably insulated therefrom, as shown at 11c (see Figs. 1, 4 and 5). The inner end of the annular member 11a is rigidly seated against a collar 12' provided on the conductor shaft 12 (as later set forth), but insulated therefrom by the insulation 11c. The conductor sleeve 11a rotatably extends through the bearings 5x', whereby one end of the assembly is rotatably supported. The outer end of the annular member 11a is reduced to form a seat 11a' for the electrode 6, which is rigidly secured thereto, as later set forth, to insure electrical contact with said member. A sleeve 13 formed of suitable insulation material is provided on the conductor member 11a to insulate it from the bearings 5x' and frame 5. The conductor 12, which is a shaft formed of suitable conducting material, such as copper, is connected at its outer end to the electrode 6a in the following manner: 11d indicates a cap having a side wall which is externally reduced to form a seat 11d' for the electrode 6a. The cap 11d is secured to the outer end of the shaft 12 by a plurality of cap screws 11e which act through the cap and electrode 6a and insulation 6x to secure the electrode 6 in its seat 11a' and also to secure the annular member 11a against the collar 12'. The inner end of the conductor shaft 12 is formed with an inwardly extending recess 12a into which the inner end of a tubular member 14 (preferably formed of steel) extends and is rigidly secured to the inner walls of the recess 12a. The tubular member 14 extends through the bearings 5x, whereby the other end of the assembly is rotatably supported by the frame 5. The bearings 5x are preferably of the double tapered roller type (as shown in the aforesaid Letters Patent) to prevent endwise movement of the tubular member 14 and conductor shaft 12 due to heating of the latter. The inner end of the conductor shaft 12 is connected to a yoke or spider 15 having equally spaced radially extending integral wings or arms 15a, each electrically connected to the secondary coils 9c of the adjacent transformer 9 midway their respective terminals 9d, 9d', as shown in Figs 1b and 8. As will be understood, the yoke 15 and its wings are formed of conducting material such as copper. The yoke 15 is split radially outwardly from its inner wall in line with and centrally of the wings 15a, as shown at 15b, and formed with tangentially disposed through openings 15c to receive bolts 15d for clamping the split portions of the yoke 15 to the conductor shaft 12, to insure a good electrical connection with the latter. The inner end of the tubular member 14 has a pressed fit with the inner walls of the recess 12a to secure it therein, but as the yoke 15 surrounds the recess 12a, it will be observed that the clamping of the yoke to the conductor shaft 12 serves to exert inward pressure on the tubular member 14 to insure a fixed relation between it and the conductor shaft 12.

As shown in Fig. 1b, each secondary coil of each transformer, midway its terminals 9d, 9d', is provided with a laterally extending pad 9c' and each wing 15a engages with and is rigidly secured to all of the pads of the secondary coils 9c of the adjacent transformer 9 by suitable bolts 15x, the inner end of each bolt being threaded into the adjacent winding 9c as shown in Figs. 1 and 1b.

The electrical connections for supplying A. C. to the primary coils 9b of each transformer 9 comprise the following: 16 indicates a lead extending from the primary coils of the adjacent transformer 9 to a terminal 16a, which is electrically connected to a collector ring, the ring in turn being engaged by suitable brushes 17 supported by and connected to the inner end of a conductor 17a. The conductor 17a is mounted in and suitably insulated from the adjacent hanger 5a, the outer end of the conductor being connected to a lead b as shown in Fig. 1. These connections are similar to like parts shown in my aforesaid Letters Patent No. 2,395,059, for which reason they are not illustrated in detail.

As already set forth, the conductor 12 is connected through the yoke 15 and the wings 15a to the secondary coils, of the respective transformers 9, midway the terminals 9d, 9d', of these coils and said terminals of the secondary coils of each transformer in turn are in electrical contact with the conductor members 18, 18a, respectively, on the inner side of the adjacent rectifier 10, the terminals 9d, 9d', and the conductors being secured together by suitable bolts 19, whereas the spaced conductor members 20, 20a, (related to the conductors 18, 18a, respectively) on the outer side of the adjacent rectifier 10 are common to and in electrical contact with one of the arms 11b of the conductor 11 (see Fig. 5a) the conductor members 20, 20a, and the adjacent arm 11b being secured together by suitable bolts 21. In this arrangement it will be observed that alternate alternations of the stepped down A. C. flow through the conductor 20 to the conductor 18 and that the other alternate alternations flow through the conductor 20a to the conductor 18a (see Fig. 5a), so that the resulting current flows in the same direction from the conductors 20, 20a, to the adjacent rectifier. As the impulses in each phase supplied by the transformers 9 are in successive, overlapping synchronous order, the resulting D. C. is substantially uniform to insure continuous welding devoid of stitching effects.

The spider 15 with its three radially extending arms 15a comprises a radial flange member for supporting the three transformers 9. The sleeve 11a with the three radial arms 11b constitutes a second radial flange member for supporting the six rectifier units 10 which are connected to the three transformers. The first flange member also constitutes a common terminal to which the midpoints of all the secondary windings are connected, and the second flange member constitutes a common terminal for all six rectifier units.

Each rectifier 10 consists of the following: the conductor members 18, 18a, conductor members 20, 20a, and electronic elements, indicated as an entirety at 22, between each conductor member 18, 18a, and the adjacent conductor members 20, 20a, respectively, suitably spaced by insulation material. As shown in Figs. 5 and 5a, the spacing between the conductor members 18, 18a, and the conductor members 20, 20a, respectively, are closed on all sides by suitable insulation material 24. The insulation material 24 is secured to the side walls of the conductor members 18, 18a, and 20, 20a, by screws 24a and also sealed with respect to these walls by cement or other suitable material to make the spacing air and gas tight. The inner wall of the material 24 is provided with ribs 24b which fit complementary recesses in the outer sides of the conductor members 18, 18a, 20, 20a, to hold these members in rigid relation with the electronic elements supported between them. The inner wall of the insulation material between the ribs 24b is recessed to provide a conduit 25 connected with spacing between the conductor members and at one side each conduit is provided with a valve controlled outlet 25a, which permits the conduit and spacing to be evacuated and then charged with a suitable gas, such as argon, neon, nitrogen or other suitable gas. The electronic elements 22 between each conductor member 18, 18a, and one of the conductor members 20, 20a, comprise a cathode and an anode spaced therefrom. Each cathode consists of a layer of nickel or tungsten 22a in face-to-face relation with the adjacent conductor member 18 or 18a, which layer is coated with thorium, cesium oxide, strontium oxide or selenium oxide 22a', whereas each anode consists of a layer of nickel or tungsten 22b in face-to-face relation with the adjacent conductor 20 or 20a (see Fig. 6). Between each cathode 22a and the adjacent anode 22b I provide a sheet of suitable insulation material 26, formed with a plurality of openings 26a to permit the electrons emitted by the cathode 22a to migrate to the anode. The means for heating the cathode 22a in each conductor member 18, 18a, consist in forming therein an elongated opening 27 preferably of inverted U-shape, in which is molded a tube 27a formed of a metallic alloy which does not oxidize readily and a section of a suitable heating coil 28 extending through the tube 27a and having at its opposite ends suitable terminals 28a to which electric current is supplied from a suitable source (not shown). The current for the heating coils may be supplied from an external source of the A. C. supplied to the transformers 9. In either arrangement, the current is regulated to control the heating of the coils 28.

From the foregoing description it will be observed that the electrons emitted by the cathodes related to conductor members 18, 18a, respectively, flow to the anodes related to adjacent conductor members 20, 20a, respectively, to provide a path for the current, as later set forth.

The current flows as follows:

Starting from the electrode 6, with reference to the impulse of one of the transformers, the current will flow through the annular conductor member 11a, an arm 11b, and at the moment when the terminal 9d of the transformer secondary windings is or may be negative in polarity, the current will enter the adjacent rectifier through conductor member 20, across the electronic elements 22 related thereto, to the conductor member 18, then through the adjacent terminal 9d and through one-half of the secondary windings 9b connected to said terminal, to a wing 15a, the yoke 15, and the conductor shaft 12 to the electrode 6a, thence, through the pipe being welded to the electrode 6, thus completing the circuit. However, at the moment when the other terminal 9d' of the secondary windings of the adjacent transformer is negative in polarity the current from the conductor arm 11b will enter the adjacent rectifier through the conductor member 20a, across the electronic elements 22 related thereto, to the conductor member 18a, then through the terminal 9d' and the other half of the secondary windings connected to the latter, to the same wing 15a, the yoke 15 and the conductor shaft 12 to the electrode 6a, thence through the pipe to the electrode 6.

It will be obvious that the circuit above set forth with respect to one transformer will be identical with respect to each of the other transformers, except that each will occur at a different time period and the current will flow through one of the other arms 11b and the wing 15a related thereto. It will thus be seen that the successive impulses flow in one direction in the circuits as described, thereby producing a direct current. It will be noted that by reversing the electronic elements between the conductor members 18, 20 and 18a, 20a, the flow of the electrons and current would be in the opposite directions, respectively.

29 indicates as an entirety means for cooling the electrodes 6, 6a, and conductors 11, 12. The cooling means comprise the following: 30 indicates a supply pipe for a coolant under pressure, such as water, extending into a joint 31, one member of which is suitably fixed to the outer end of the tubular member 14 and is provided with a fitting 31a to which the supply pipe 30 and a discharge pipe 30a are connected. The supply pipe 30 is rotatably related to the outer end of a pipe 32 mounted in the tubular member 14 and threaded at its inner end into the outer end of a conduit 33 extending axially through the conductor shaft 12. The outer end of the conduit 33 is connected to a chamber 33a formed in the cap 11d, the chamber in turn being connected to recesses 34. The recesses 34 register with the outer ends of grooves 35 formed in and extending longitudinally of the inner wall of the annular member 11a and uniformly spaced therearound (see Fig. 4). The inner ends of the grooves 35 are connected to a circumferential recess 36 formed in the inner wall of the annular member 11a, which recess is connected to an outlet duct 36a. The outlet duct 36a is connected to one end of a flexible hose 37, the opposite end of which is connected to an inlet 38 leading through the conductor shaft 12 and tubular member 14 into the space or chamber in the latter surrounding the pipe 32, this chamber forming a flow channel for the coolant to the discharge pipe 30a.

38x indicates as an entirety means for cooling the secondary windings 9c of each transformer 9. The cooling means 38x consist of manifolds 38a mounted on the opposite sides of the secondary coils 9c and pipes 38b, one for each coil, leading through the latter from end to end from one manifold 38a to the other manifold 38a. The lower end of one manifold 38a serves as the inlet for the coolant and the lower end of the other manifold 38a serves as the outlet for the coolant. The inlet and outlets for the manifolds may be suitably connected with the hose 37 to provide flow of the coolant to and from the manifolds 38a for each transformer from the outlet 36a through the transformers to the inlet 38.

52 indicates a motor mounted on the frame 5. The motor shaft is connected to one element of a one-way revolution clutch 53. The other element of the clutch 53 is provided with a sprocket 54 which is engaged by an endless chain 55, the latter in turn engaging a sprocket 56 fixed to the sleeve 13, whereby the assembly may be rotated when it is desired to refinish the peripheries of the electrodes 6, 6a. By employing a one-way clutch, the motor 52 is not driven by the welding apparatus 5' during rotation thereof as welding operations take place.

From the foregoing description it will be observed that, in providing a unitary apparatus wherein the A. C. is supplied thereto, stepped down to a low voltage and rectified into a unidirectional D. C., not only is the number of brushes and sliding or moving contacts reduced, but that by connecting one welding electrode to the secondary coils of the transformers midway their respective terminals and connecting the other welding electrode through a uni-directional rectifier having conductors electrically connected to these terminals, respectively, whereby corresponding alternations of the A. C. flow to one terminal and therethrough and through the adjacent half of the secondary coils, and the other corresponding alternations of the A. C. flow through the other terminal and therethrough and through the adjacent half of the secondary coils, substantial simplification results, in that the number of parts, cost of manufacture and upkeep are materially reduced and assembly is facilitated; also, that by reason of this simplified construction it follows that current losses are reduced to a minimum.

This application is a division of my co-pending application filed Nov. 24, 1945, Serial No. 630,579.

To those skilled in the art to which my invention relates many changes in construction and widely differing embodiments and applications of the invention will be apparent without departing from the spirit and scope thereof. My disclosures and the description herein are purely for illustrative purposes and are not intended to be in any sense limiting.

What I claim is:

1. In apparatus of the class described, the combination with a frame, of a rotatable support on said frame, one portion of said support being formed of electrical conducting material to serve as a conductor adapted to be electrically connected to an electrode mounted on said support, a separate conductor on said support insulated from said conducting material and adapted to be electrically connected at one end to a separate electrode on said support, a multi-phase transformer, the primary coils of which are adapted to be connected to an A. C. supply on said support, electrical connections between the conducting material of said support and the secondary coils for each phase of said transformer and connected to the latter midway the terminals thereof, and uni-directional electronic rectifying means on said support between and electrically connected to each of said terminals and said separate conductor.

2. In apparatus of the class described, the combination with a frame, of a rotatable support on said frame, one portion of said support being formed of electrical conducting material to serve as a conductor adapted to be electrically connected to an electrode, a separate electrical conductor electrically insulated from said conducting material and adapted to be electrically connected at one end to a separate electrode, a multi-phase transformer the primary coils of which are adapted to be connected to an A. C. supply, electrical connections between the conducting material of said support and the secondary coils for each phase of said transformer and connected to the latter midway the terminals thereof, and unidirectional rectifying means mounted on said support and consisting of a cathode, an anode spaced from said cathode and means for heating one of said elements disposed between and electrically connected to each of said terminals and said separate conductor.

3. In apparatus of the class described, the combination with a frame, of a support rotatably mounted thereon and having a portion formed of electrical conducting material to provide a conductor adapted to be electrically connected to an electrode mounted on said support, a separate electrical conductor engaging a portion of said support and electrically insulated therefrom and adapted to be electrically connected to a separate electrode mounted on said support, a plurality of transformers mounted on said support, one transformer for each phase of an A. C. supply, the primary coils of said transformers being adapted to be connected to a source of A. C. supply, uni-directional rectifying means for each of said transformers mounted on said support and consisting of a cathode element, an anode element spaced from said cathode element, means for heating one of said elements, a pair of electrical conductor members electrically connected respectively to the terminals of the secondary coils of one of said transformers and one of said elements, a separate pair of electrical conductor members electrically connected to the other element, electrical connections between said first mentioned conductor and the secondary coils of each transformer midway the terminals thereof, and an electrical connection common to each of said separate pairs of conductors and electrically connected to said separate conductor.

4. An apparatus as claimed in claim 3 wherein one said conductor member of each pair thereof is formed with an elongated opening in which is mounted a heating coil for heating the adjacent cathode and means are provided for supplying electric current to each of said heating coils.

5. In apparatus of the class described, the combination with a frame, of a support rotatably mounted on said frame, transformers mounted on said support, one for each phase of an A. C. supply, the primary coils of said transformers being adapted to be connected to a source of A. C. supply, a conductor on said support adapted to be electrically connected at one end to an electrode on said support, the other end of said conductor being electrically connected to the secondary coils of each of said transformers midway the respective terminals thereof, and unidirectional rectifying means for each of said transformers mounted on said support and consisting of a pair of conductor members respectively electrically connected to the terminals at the opposite ends of said secondary coils of the adjacent transformer, a separate pair of conductor members, each of the latter members being related to one of said first mentioned members, electronic elements carried by the opposed faces of each first mentioned conductor member and the adjacent separate conductor member, spacing means between said elements forming a chamber for electron flow between said elements, means for sealing said chamber and means for heating the members of one of said pair thereof and a terminal conductor member electrically connected to said separate pair of conductor members and to a separate electrode mounted on said support.

HOWARD I. MORRIS.

REFERENCES CITED

The following references are of record in the file of this patent:

UNITED STATES PATENTS

| Number | Name | Date |
| --- | --- | --- |
| 1,582,269 | Johnson et al. | Apr. 27, 1926 |
| 1,851,517 | Jones et al. | Mar. 29, 1932 |
| 2,283,941 | Morris | May 26, 1942 |
| 2,395,059 | Morris | Feb. 19, 1946 |
| 2,414,287 | Crever | Jan. 14, 1947 |